Aug. 14, 1945.    H. C. LORD    2,382,373
FRICTIONAL CONTROLLING DEVICE FOR ROTATING BODIES
Filed July 15, 1943    2 Sheets-Sheet 1
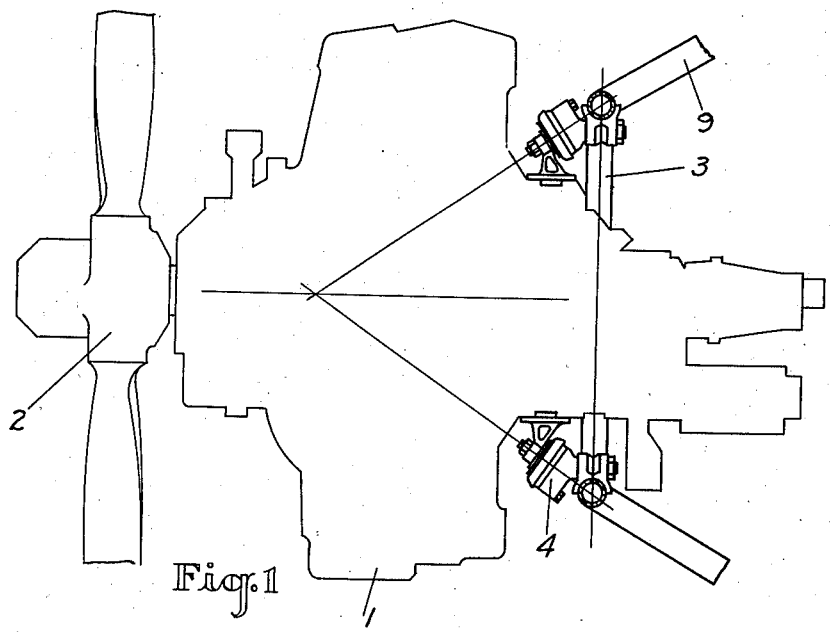
Fig. 1
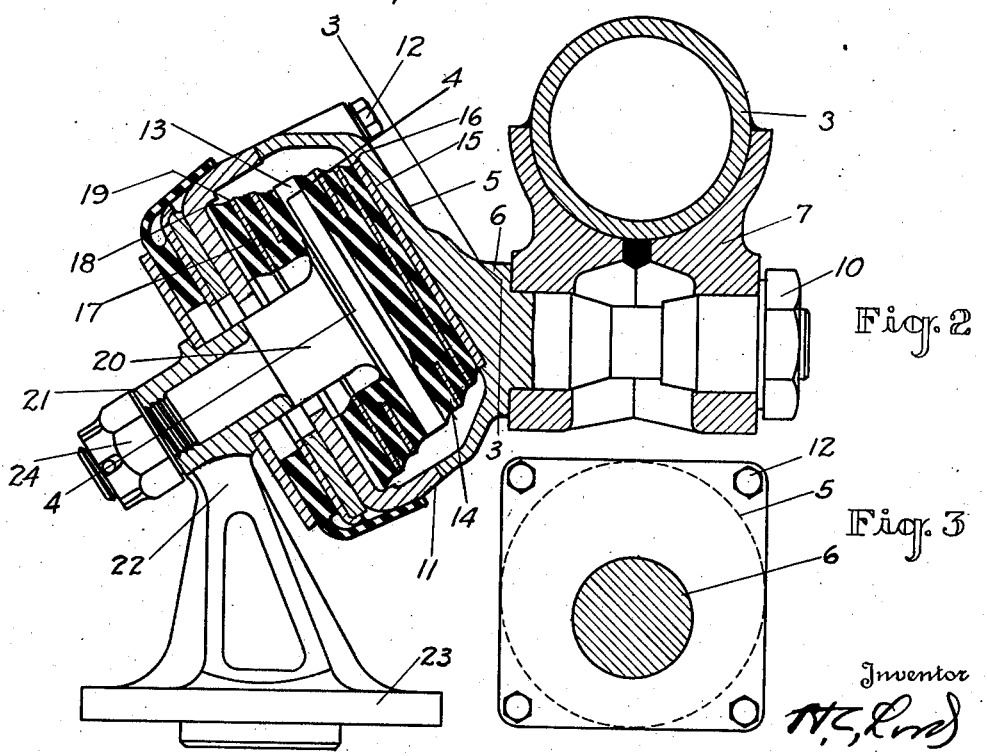
Fig. 2
Fig. 3
Inventor
H. C. Lord Aug. 14, 1945.     H. C. LORD     2,382,373
FRICTIONAL CONTROLLING DEVICE FOR ROTATING BODIES
Filed July 15, 1943     2 Sheets-Sheet 2

Inventor
H. C. Lord

Patented Aug. 14, 1945

2,382,373

UNITED STATES PATENT OFFICE 2,382,373

FRICTIONAL CONTROLLING DEVICE FOR ROTATING BODIES

Hugh C. Lord, Erie, Pa., assignor to Lord Manufacturing Company, Erie, Pa., a corporation of Pennsylvania Application July 15, 1943, Serial No. 494,792

6 Claims. (Cl. 248—5)

Rotating bodies, such as air plane engines, are subject to serious vibratory disturbances, particularly so with varying speeds. Attempts have been made to assist in the control of the more violent vibrations by interposing friction resistances as well as yielding resistances to the vibrational forces.

The present invention is designed to improve these controlling devices, providing a frictional means which yields without frictional action where the vibrational disturbances are small but move frictionally as the vibrations become more violent.

The invention is exemplified with relation to an airplane engine provided with resilient mountings utilizing rubber of similar material yieldingly resisting torque and pitch and yaw movements in shear of the rubber.

Features and details of the invention will appear from the specification and claims.

A preferred embodiment of the invention is illustrated in the accompanying drawings as follows:

Fig. 1 shows a side elevation of the engine indicating the mountings and frictional controlling device.

Fig. 2 a central section through one of the mounting units with the frictional device in place thereon.

Fig. 3 a section on the line 3—3 in Fig. 2.

Figure 4:
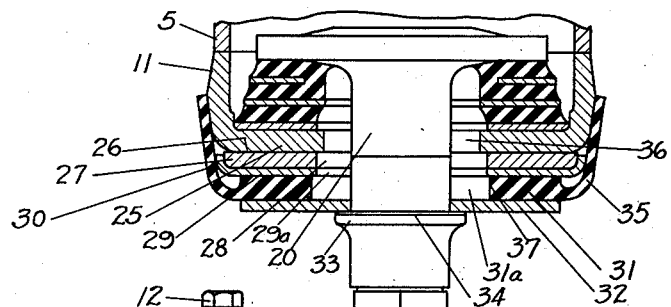
Figure 5:
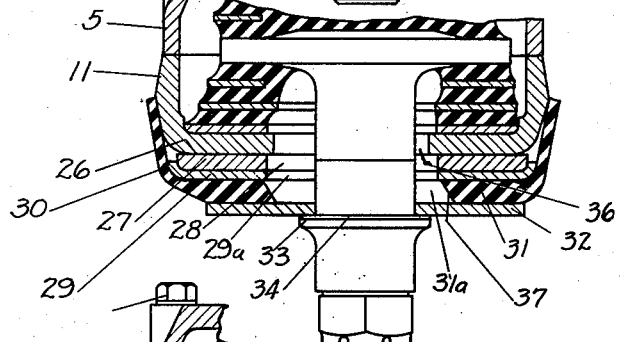
Figure 6:
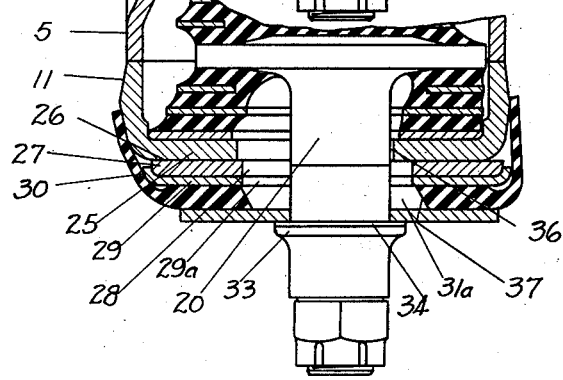

Figs. 4, 5 and 6 sectional views of the mounting on the line 4—4 in Fig. 2 showing the different positions of the frictional device under different vibratory disturbances.

1 marks an airplane engine, 2 a propeller carried by the engine, 3 a mounting ring for the engine, 4 mounting units supporting the engine from the ring in a manner substantially common to such mountings. As shown, these mountings provide sandwiches, the planes of which are normal to lines extending to a focal point adjacent to the center of gravity of the engine so that the resilient element of the mounting, such as rubber, responds to torque, pitch and yaw thrusts in shear of the rubber.

Each mounting unit has a cover member 5 from which extends a shank 6, the shank extending through a clamping member 7 secured to the mounting ring 3. The usual struts 9 support the ring in the usual manner. Nuts 10 are provided for securing the shanks in place.

A housing member 11 is opposed to the member 5 and secured thereto by studs 12. A central core disk 13 is arranged between the housing members, and a resilient element 14 is bonded to the core member 13 and also to a plate 15. The plate 15 is centered by shoulders 16 in the housing member 5. A resilient member 17 is bonded to the core and is centered by shoulders 18. Reenforcing plates 19 are provided in the rubber, these plates increasing the resistance in an axial direction.

A shank 20 extends from the core through an opening in the resilient element and an opening 36 in the housing member and through an opening 21 in a bracket 22. The bracket 22 is carried on a base 23 secured to the engine. A nut 24 is arranged on the ends of the shank 20 for securing the shank on the bracket. The openings in the resilient member and housing member 11 are large enough to permit of the relative vibratory movement between the core and housing. These parts in general are in common use.

The frictional device is shown in more detail in Figs. 4 to 6. The end 25 of the member 11 has a friction surface 26. A friction disk 27 of preferable friction material engages this surface. This friction disk has an opening 28 permitting relative movement between the disk and the shank 20. An actuating plate 29 engages the outer surface of the friction disk 27 and is locked therewith by an annular shoulder 30 which engages the outer periphery of the disk 27. This plate also has an opening 29a permitting movement relatively to the shank 20.

A resilient element 31 is arranged on the outer surface of the plate 29, and may be bonded to it. This element is of rubber or similar material and is provided with an opening 31a somewhat larger than the shank 20. A plate 32 engages the outer surface of the element 31 and is fixed on the shank 20. This plate is backed by a shoulder 33 and may be made adjustable so as to give the desired pressure to the element 31. As indicated, a shim 34 is provided. Different thicknesses may be introduced to give the desired compression.

The operation of this friction device is as follows: As indicated in Fig. 4, the parts are substantially central. As the thrusts on the mounting are applied, the resilient element of the mounting yields and the core and housing move relatively to the position shown in Fig. 5.

It will be noted that a portion of the walls of the openings 28 and 36 are brought closer to the shank 20 and that the diametrically opposite portion thereof is moved farther from such shank. This might be termed the full normal load position. It will be noted that the wall 37 of the opening 31a has assumed an inclined position. In other words, the resilient element 31 has yielded in shear, but there has been not sufficient force built up on the element 31 to move the friction member 27 relatively to the surface 26 of the cover plate 11. When, however, the disturbance becomes greater and the wall of the opening 36 becomes closer to the shank, the resistance of the friction member 27 on the surface 26 becomes less than the resistance to further movement in the resilient element 31 and the friction element is then moved with the vibratory action to the position indicated in Fig. 6. Thus in any normal disturbance, either in torque or pitch and yaw, there is no frictional movement of the plate 27 on the surface 26 to disturb the control. When, however, the vibratory disturbances become more violent, the frictional action comes into play by movement of plate 27 on the surface 26 and assists in controlling such vibration. It will be understood that the frictional element 27 may, if desired, be dispensed with and a friction surface applied directly to the resilient element 31.

It is desirable to protect the friction surfaces from moisture and this is effected in the structure herein described by lips 35 which extend from the periphery of the element 31 which extend over and resiliently engage the outer surface of the cover member 11.

What I claim as new is:

1. In an engine suspension, a mounting extending transversely to the torsional and pitch and yaw engine vibrations and comprising members for connection respectively to the engine and its support and including resilient means acting between said members to resist vibration thrusts communicated by one to the other thereof; a vibration controller comprising a pair of relatively movable friction members having opposed surfaces frictionally contacting each other, and a yielding backing having spaced faces fixed respectively to one of said friction members and one of said mounting members providing for limited shear action of said backing upon initial relative movements of said mounting members without imparting sliding to said friction members and to effect sliding movements between said friction members upon yielding of the backing beyond said limit.

2. In an engine suspension, a mounting extending transversely to the torsional and pitch and yaw engine vibrations and comprising members for connection respectively to the engine and its support and including resilient means acting between said members to resist vibration thrusts communicated by one to the other thereof, one of said mounting members having a housing enclosing the resilient means; a vibration controller comprising a pair of relatively movable friction members having opposed surfaces frictionally contacting each other, one of the surfaces being fixed to the housing, and a yielding backing having spaced faces respectively fixed to the other of said friction members and the other of said mounting members providing for limited shear action of said backing upon initial relative movements of said mounting members without imparting sliding to said friction members and to effect sliding movements between said friction members upon yielding of the backing beyond said limit.

3. In an engine suspension, a mounting extending transversely to the torsional and pitch and yaw engine vibrations and comprising members for connection respectively to the engine and its support and including resilient means acting between said members to resist vibration thrusts communicated by one to the other thereof; a vibration controller comprising a pair of relativley movable friction members having opposed surfaces frictionally contacting each other, a yielding backing having spaced faces fixed respectively to one of said friction members and one of said mounting members providing for limited shear action of said backing upon initial relative movements of said mounting members without imparting sliding to said friction members and to effect sliding movements between said friction members upon yielding of the backing beyond said limit, and a lip on the backing extending around the edges of the friction members and forming a seal protecting the friction members.

4. In an engine suspension, a mounting extending transversely to the torsional and pitch and yaw engine vibrations and comprising members for connection respectively to the engine and its support and including resilient means acting between said members to resist vibration thrusts communicated by one to the other thereof, one of said mounting members having a housing enclosing the resilient means; a vibration controller comprising a pair of relatively movable friction members having opposed surfaces frictionally contacting each other, one of the surfaces being fixed to the housing, a yielding backing having spaced faces respectively fixed to the other of said friction members and the other of said mounting members providing for limited shear action of said backing upon initial relative movements of said mounting members without imparting sliding to said friction members and to effect sliding movements between said friction members upon yielding of the backing beyond said limit, and a lip on the backing extending around the edges of the friction members to the housing and forming a seal protecting the friction members.

5. In an engine suspension, a mounting comprising members for connection respectively to the engine and its support and including resilient means acting between said members to accommodate torsional vibrations by relative movement of said members in the direction of the vibrations, a vibration controller comprising a pair of selectively movable friction members having opposed surfaces frictionally contacting each other and extending in the direction of said vibrations, and a yielding backing having spaced faces fixed respectively to one of said friction members and one of said mounting members providing for limited shear action of said backing upon initial relative movements of said mounting members without imparting sliding to said friction members and to effect sliding movements between said friction members upon yielding of the backing beyond said limit.

6. In an engine suspension, a mounting comprising members for connection respectively to the engine and its support and including resilient means acting between said members to accommodate pitch and yaw vibrations by relative movement of said members in the direction of the vibrations, a vibration controller comprising a pair of selectively movable friction members having opposed surfaces frictionally contacting each other and extending in the direction of said vibrations, and a yielding backing having spaced faces fixed respectively to one of said friction members and one of said mounting members providing for limited shear action of said backing upon initial relative movements of said mounting members without imparting sliding to said friction members and to effect sliding movements between said friction members upon yielding of the backing beyond said limit.

HUGH C. LORD.